United States Patent
Hung et al.

(10) Patent No.: US 8,120,785 B2
(45) Date of Patent: Feb. 21, 2012

(54) SYSTEM AND METHOD FOR INSPECTING THREE-DIMENSIONAL SENSOR

(75) Inventors: Iman Hung, Tao Yuan Shien (TW); Yu-Chi Chung, Tao Yuan Shien (TW); Hsin-Hung Lee, Tao Yuan Shien (TW)

(73) Assignee: Quanta Computer, Inc. (TW)

( * ) Notice: Subject to any disclaimer, the term of this patent is extended or adjusted under 35 U.S.C. 154(b) by 100 days.

(21) Appl. No.: 12/839,603

(22) Filed: Jul. 20, 2010

(65) Prior Publication Data

US 2011/0267626 A1    Nov. 3, 2011

(30) Foreign Application Priority Data

Apr. 30, 2010    (TW) .............................. 99113767 A

(51) Int. Cl.
*G01B 11/24*    (2006.01)
(52) U.S. Cl. ..................................... 356/601; 356/243.8
(58) Field of Classification Search .......... 356/601–623, 356/243.1–243.8
See application file for complete search history.

(56) References Cited

U.S. PATENT DOCUMENTS

| | | | | |
|---|---|---|---|---|
| 6,075,605 | A * | 6/2000 | Futamura et al. | 356/608 |
| 6,441,888 | B1 * | 8/2002 | Azuma et al. | 356/4.01 |
| 7,804,586 | B2 * | 9/2010 | Rodrigues et al. | 356/4.01 |
| 2009/0201386 | A1 * | 8/2009 | Ono | 348/222.1 |
| 2011/0157353 | A1 * | 6/2011 | Takayama et al. | 348/135 |

* cited by examiner

*Primary Examiner* — Hoa Pham
(74) *Attorney, Agent, or Firm* — Thomas, Kayden, Horstemeyer, Risley, LLP.

(57) ABSTRACT

The invention provides a system and method for inspecting a three-dimensional sensor. According to the invention, a light source is controlled to emit a light of a known phase, and the known phase of the emitted light is altered by at least two known phase values. The three-dimensional sensor is driven in sensing the light reflected by the inspecting space to capture an image. In accordance with the captured image and the relative angle and the active brightness of each pixel thereof and the plurality of reference data, at least two quality data relative to the three-dimensional sensor are calculated.

10 Claims, 19 Drawing Sheets

SYSTEM AND METHOD FOR INSPECTING THREE-DIMENSIONAL SENSOR

CROSS-REFERENCE TO RELATED APPLICATION

This utility application claims priority to Taiwan Application Serial Number 099113767, filed Apr. 30, 2010, which is incorporated herein by reference.

BACKGROUND OF THE INVENTION

1. Field of the Invention

The invention relates to a system and method for inspecting a three-dimensional sensor and, more particularly, to a convenient and safe system and method for inspecting a three-dimensional sensor which can be used for inspecting quality data such as defect pixel and sensitivity of a large number of three-dimensional sensors.

As to the prior art related to the invention, please refer to the following technical literatures:
[1] U.S. Pat. No. 7,471,376;
[2] U.S. Pat. No. 7,408,627; and
[3] U.S. Pat. No. 7,375,083.

2. Description of the Prior Art

More and more electronic products use three-dimensional sensors to promote functions and features of products. For electronic product manufacturers, how to inspect reliability and stability of three-dimensional sensors when using large number of three-dimensional sensors is an important issue. Since a three-dimensional sensor has one more dimension than a typical two-dimensional sensor, inspecting functions and features of three-dimensional sensors is more difficult. Particularly, how to conveniently and safely inspect a large number of three-dimensional sensors when is a problem electronic product manufacturers eager to solve.

Accordingly, a scope of the invention is to provide a system and method for inspecting a three-dimensional sensor. More particularly, the inspecting system and method according to the invention has advantages of convenience and safety, and it can be used for inspecting quality data such as defect pixel and sensitivity of a large number of three-dimensional sensors.

SUMMARY OF THE INVENTION

According to a preferred embodiment of the invention, an inspecting system is used for inspecting a three-dimensional sensor. The inspecting system according to the invention includes a casing, a light source, a storage device, and a controlling/processing device. The casing is configured to form an inspecting space without leak of light. The three-dimensional sensor is disposed in the casing. The light source is mounted in the casing. The storage device therein stores a plurality of reference data. The controlling/processing device is electrically connected to the three-dimensional sensor, the light source and the storage device respectively. The controlling/processing device functions controlling the light source to emit a light of a known phase and altering the known phase of the emitted light by at least two known phase values. The controlling/processing device also functions driving the three-dimensional sensor in sensing the light reflected by the inspecting space to capture an image. The controlling/processing device calculates and corrects the captured image in accordance with the at least two known phase value and phase information of the captured image to acquire a respective relative angle and a respective active brightness of each pixel of the captured image. The controlling/processing device also calculates at least two quality data relative to the three-dimensional sensor in accordance with the captured image and the relative angle and the active brightness of each pixel thereof and the plurality of reference data.

In an embodiment, the at least two quality data relative to the three-dimensional sensor include a two-dimensional sensitivity. The plurality of reference data include a golden range of average gray value. The controlling/processing device calculates the average gray value of the captured image, and calculates the two-dimensional sensitivity in accordance with the average gray value of the captured image and the golden range of average gray value.

In an embodiment, the at least two quality data relative to the three-dimensional sensor include a defect pixel data. The plurality of reference data include a brightness threshold of the captured image acquired by a golden sensor. The controlling/processing device selectively determines the defect pixel data in accordance with the captured image and the brightness threshold of the captured image.

In an embodiment, the plurality of reference data include a Z-axial calibration data and an XY-axial calibration data acquired by a golden sensor. The controlling/processing device also transforms the captured image and the relative angle and the active brightness of each pixel thereof into a plurality of sets of world coordinates.

In an embodiment, the at least two quality data relative to the three-dimensional sensor include a plurality of sets of linear displacement errors, a plurality of sets of squareness errors and a plurality of sets of volumetric errors. The plurality of reference data include a plurality of sets of world coordinates relative to the golden sensor. The controlling/processing device also calculates the plurality of sets of linear displacement errors, the plurality of sets of squareness errors and the plurality of sets of volumetric errors in accordance with the plurality of sets of world coordinates relative to the captured image and the plurality of sets of world coordinates relative to the golden sensor.

According to a preferred embodiment of the invention, an inspecting method is used for inspecting a three-dimensional sensor. An inspecting space without leak of light is previously provided. A light source is disposed in the inspecting space. A plurality of reference data is previously stored. The inspecting method according to invention, firstly, disposes the three-dimensional sensor in the inspecting space. Then, the inspecting method controls the light source to emit a light of a known phase, and alters the known phase of the emitted light by at least two known phase values. Next, the inspecting method drives the three-dimensional sensor in sensing the light reflected by the inspecting space to capture an image. Then, the inspecting method, according to the at least two known phase value and phase information of the captured image, calculates and corrects the captured image to acquire a respective relative angle and a respective active brightness of each pixel of the captured image. Finally, the inspecting method, according to the captured image and the relative angle and the active brightness of each pixel thereof and the plurality of reference data, calculates at least two quality data relative to the three-dimensional sensor.

The advantage and spirit of the invention may be understood by the following recitations together with the appended drawings.

BRIEF DESCRIPTION OF THE APPENDED DRAWINGS

DETAILED DESCRIPTION OF THE INVENTION

The invention provides a system and method for inspecting a three-dimensional sensor. More particularly, the inspecting system and method according to the invention has advantages of convenience and safety. Furthermore, the inspecting system and method according to the invention can be used for inspecting quality data such as defect pixel and sensitivity of a large number of three-dimensional sensors. With following detailed explanations of the preferred embodiments of the invention, the features, spirits, advantages, and feasibility of the invention will be hopefully well described.

Figure 1:
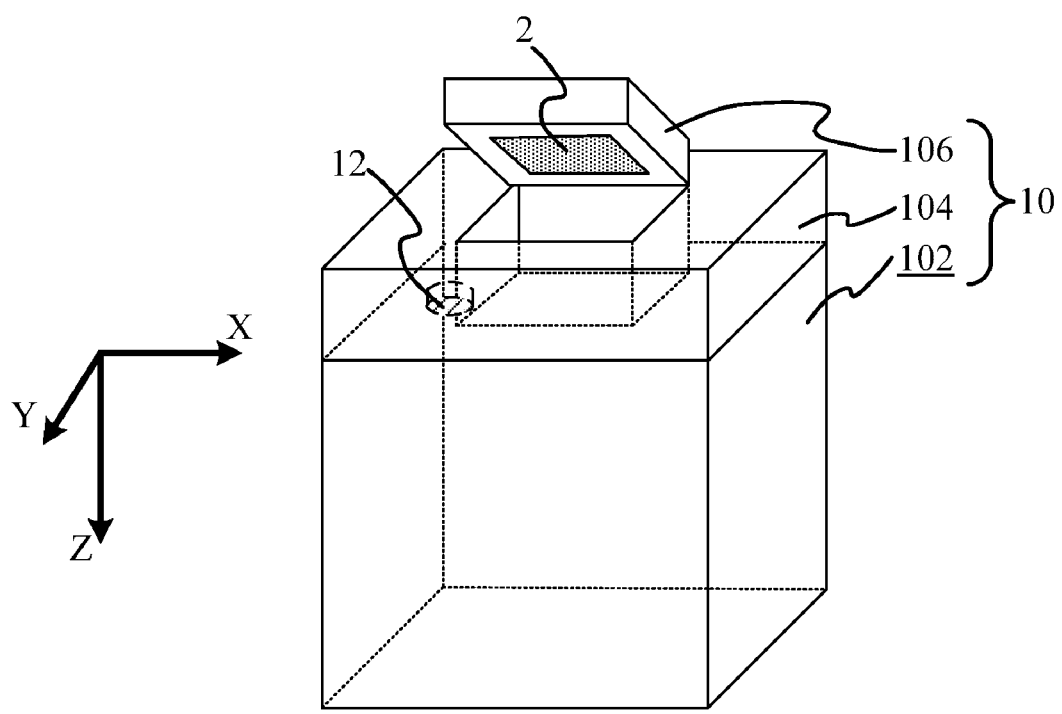
FIG. 1 is a schematic diagram illustrating a necessary component-casing of an inspecting system according to a preferred embodiment of the invention.
Figure 2:
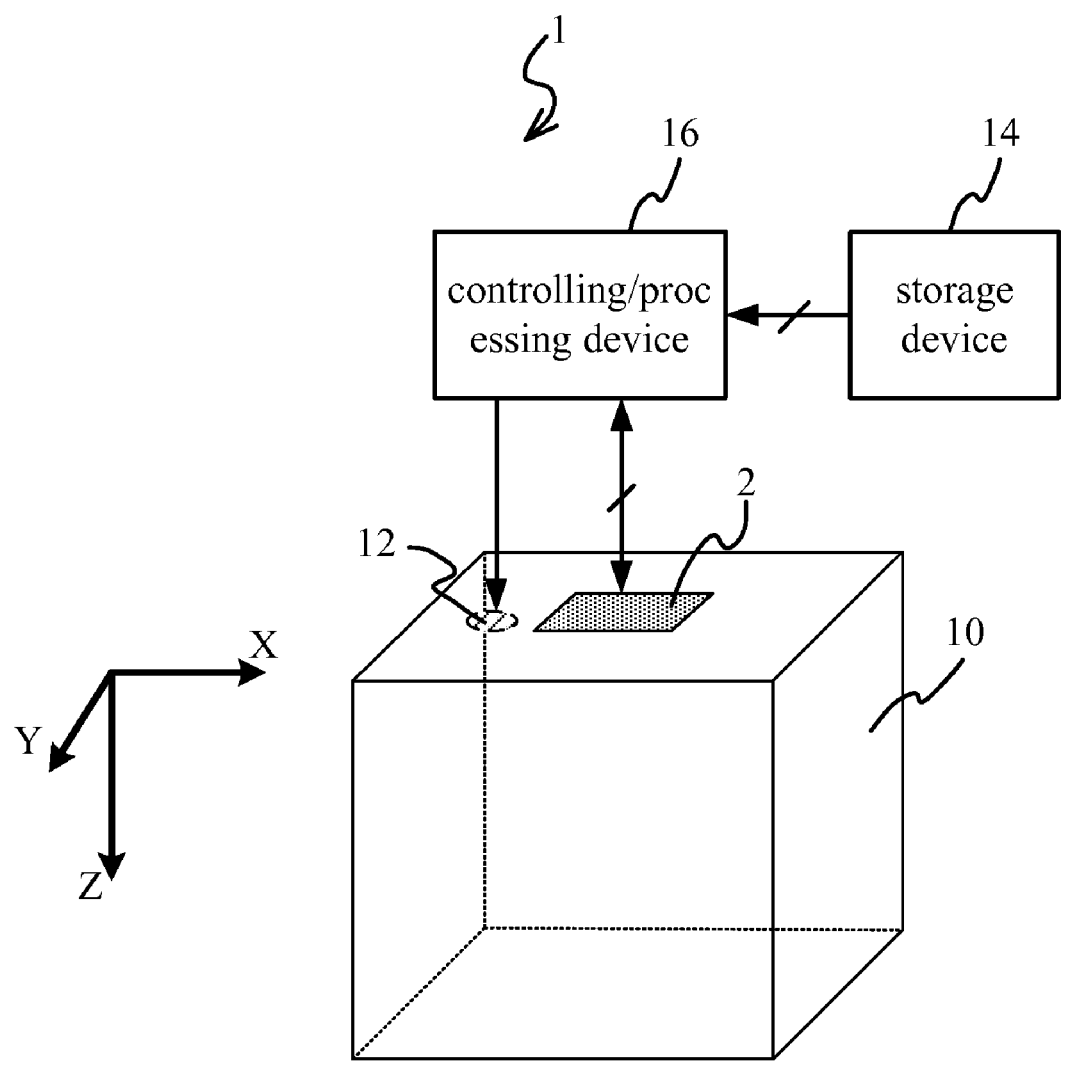
FIG. 2 is a function block diagram of the inspecting system according to the invention.

Please refer to FIG. 1 and FIG. 2. FIG. 1 is a schematic diagram illustrating a necessary component-casing 10 of an inspecting system 1 according to a preferred embodiment of the invention. FIG. 2 is a function block diagram of the inspecting system 1 according to the invention. The inspecting system 1 according to the invention is used for inspecting a three-dimensional sensor 2.

As shown in FIG. 1 and FIG. 2, the inspecting system 1 according to the invention includes a casing 10, a light source 12, a storage device 14, and a controlling/processing device 16.

In an embodiment, the light source 12 is a laser diode.

As shown in FIG. 1, the casing 10 is configured to form an inspecting space 102 without leak of light. The three-dimensional sensor 2 is disposed in the casing 10. The light source 12 is mounted in the casing 10. In one case, the casing 10 is substantially divided into an upper part 104 and a lower part 102, and has a lid 106 pivotally connected to the upper part 104, as shown in FIG. 1. The three-dimensional sensor 2 is mounted on the inner side of the lid 106. The light source 12 is mounted on the upper part 104 of the casing 10. As the lid 106 is closed, the lower part 12 of the casing 10 becomes an inspecting space without leak of light. During the inspection of the three-dimensional sensor 2, the inspecting space 102 without leak of light can prevent leak of light of laser and damage caused by overheat of the three-dimensional sensor 2 or the laser diode (the light source) 12. This can guarantee safety of the inspecting system 1. Design of this case is for efficiently and rapidly inspecting a large number of three-dimensional sensors.

The storage device 14 therein stores a plurality of reference data. In an embodiment, the storage device 14 is a Read Only Memory (ROM).

As shown in FIG. 2, the controlling/processing device 16 is electrically connected to the three-dimensional sensor 2, the light source 12 and the storage device 14 respectively. The controlling/processing device 16 functions controlling the light source 12 to emit a light of a known phase and altering the known phase of the emitted light by at least two known phase values.

The controlling/processing device 16 also functions driving the three-dimensional sensor 2 in sensing the light reflected by the inspecting space 102 to capture an image.

The controlling/processing device 16 calculates and corrects the captured image in accordance with the at least two known phase value and phase information of the captured image to acquire a respective relative angle and a respective active brightness of each pixel of the captured image.

Particularly, the controlling/processing device 16 also calculates at least two quality data relative to the three-dimensional sensor in accordance with the captured image and the relative angle and the active brightness of each pixel thereof and the plurality of reference data.

Figure 3:
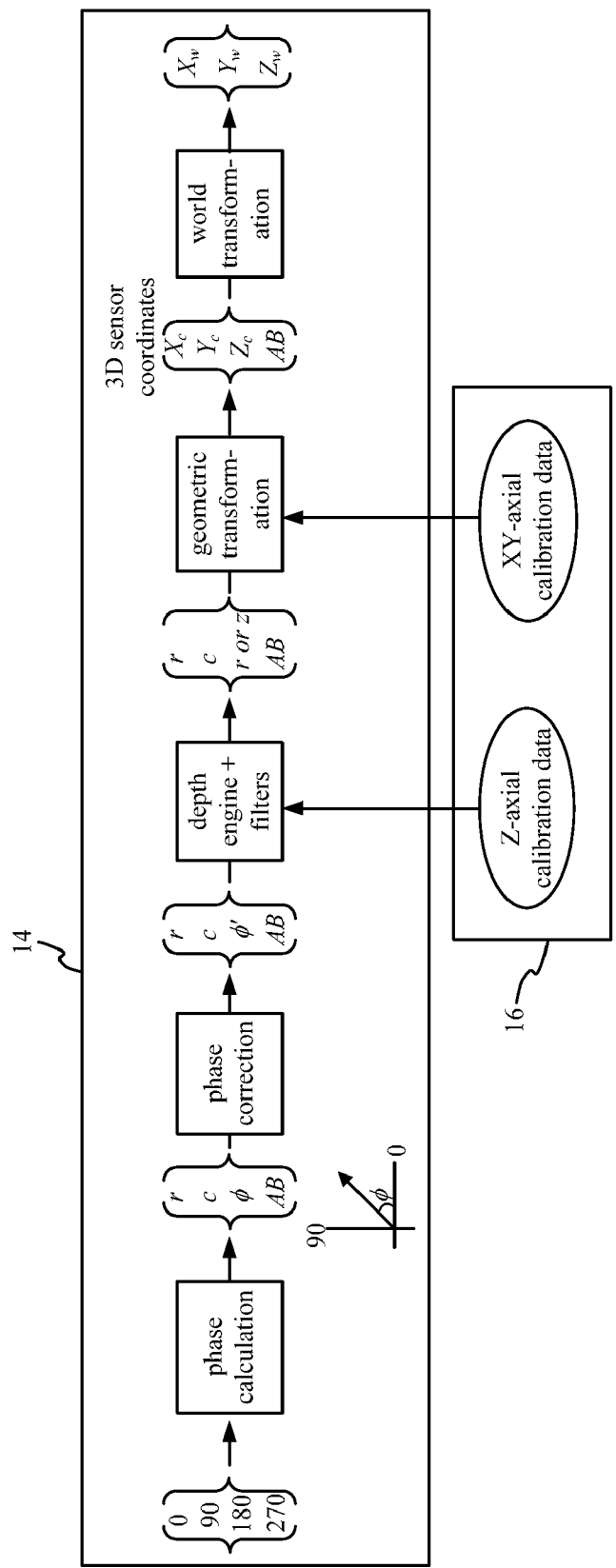
FIG. 3 is a schematic diagram illustrating the algorithm and the processing principle performed by a controlling/processing device of the inspecting according to the invention.

The controlling/processing device 16 performs all calculations and controls, including light emitting control of the light source 12, data transformation and data transmission of the captured image, etc. The plurality of reference data stored in the storage device 14 includes calibration parameters, and the calibration method is performed in accordance with the calibration method proposed in the technical literature [1]. The algorithm and the processing principle performed by the controlling/processing device 16 are shown in FIG. 3. At first, the phase information of the captured image is processed with a phase calculation (referring to technical literature [2]) and a phase correction (referring to technical literature [2]) to acquire the pixel row (r), the pixel column (c), the relative angel ($\phi$), and the active brightness (AB). The controlling/processing device 16 can calculate an average gray value of the captured image to judge a two-dimensional sensitivity relative to the three-dimensional sensor 2. Additionally, the controlling/processing device 16 can determines a defect pixel of the three-dimensional sensor 2 by a gray value of the captured image.

In an embodiment, at least two quality data relative to the three-dimensional sensor 2 include a two-dimensional sensitivity. The plurality of reference data include a golden range of average gray value. The controlling/processing device 16 calculates the average gray value of the captured image, and calculates the two-dimensional sensitivity in accordance with the average gray value of the captured image and the golden range of average gray value.

The main method for calculating the two-dimensional sensitivity is to calculate the average gray value $g_{avg}$ of the image acquired by the three-dimensional sensor 2 (as shown in equation (1)), and to judge if the average gray scale $g_{avg}$ is in the golden range $[t_{g_{min}}, t_{g_{max}}]$ of average gray scale (as shown in equation (2)). The golden range of average gray scale is the range standard set by using integrating sphere to experiment under the environment and condition the same as the inspection.

$$g_{avg} = \frac{\sum_{j=1}^{m}\sum_{i=1}^{n} P[i][j]}{nm} \quad (1)$$

$$\text{result} = \begin{cases} \text{pass,} & \text{for } t_{g_{min}} < |g_{avg}| < t_{g_{max}} \\ \text{fail,} & \text{else} \end{cases} \quad (2)$$

In an embodiment, at least two quality data relative to the three-dimensional sensor 2 include a defect pixel data. The plurality of reference data include a brightness threshold of the captured image acquired by a golden sensor. The controlling/processing device 16 selectively determines the defect pixel data in accordance with the captured image and the brightness threshold of the captured image.

The main method is to compare each pixel with surrounding pixels at each time the three-dimensional sensor 2 detects the brightness of the light, as shown in equation (3), equation (4) and equation (5). As the three-dimensional sensor 2 detects the brightness of the light, the differences between the pixel and surrounding pixels are theoretically small. If the detected differences are large, i.e. the detected pixel detects darkness but its surrounding pixels detect brightness, it means the detected pixel is a defect pixel. The brightness threshold (th) required by above calculation is acquired by previous inspection using an golden three-dimensional sensor.

$$\text{Defect} = \sum_{j=1}^{m}\sum_{i=1}^{n} D[i][j] \quad (3)$$

$$\text{where } D[i][j] = \begin{cases} 1, & \text{for } P[i][j] < th \\ 0, & \text{for } P[i][j] > th \end{cases} \quad (4)$$

$$\text{result} = \begin{cases} \text{pass,} & \text{for Defect} = 0 \\ \text{fail,} & \text{for Defect} \neq 0 \end{cases} \quad (5)$$

In an embodiment, for calibration of the three-dimensional sensitivity of the three-dimensional sensor 2, the plurality of reference data include a Z-axial (depth) calibration and an XY-axial (lateral) calibration data previously acquired by a golden three-dimensional sensor. The controlling/processing device 16 transforms the acquired information into a three-dimensional sensor coordinate {xc, yc, zc, AB} through a depth transformation (using depth engine (referring to the technical literature [3])) and the principle of RGBZ (referring to the technical literature [3]), and transforms the three-dimensional sensor coordinate into a world coordinates through a world transformation (referring to the technical literature [3]). At last, the controlling/processing device 16 compares the calibrated XYZ coordinate of the three-dimensional sensor 2 to be inspected with the XYZ coordinate of the golden three-dimensional sensor to check if the errors conform to a standard.

The three-dimensional sensitivity of the three-dimensional sensor 2 include a plurality of sets of linear displacement errors, a plurality of sets of squareness errors and a plurality of sets of volumetric errors. The plurality of reference data include a plurality of sets of world coordinates relative to the golden sensor. The controlling/processing device 16 also calculates the plurality of sets of linear displacement errors, the plurality of sets of squareness errors and the plurality of sets of volumetric errors in accordance with the plurality of sets of world coordinates relative to the captured image and the plurality of sets of world coordinates relative to the golden sensor. Calculations of the three quality data, linear displacement errors, squareness errors and volumetric errors, are described below.

Each threshold for the measurement of the three errors, linear displacement error, squareness error and volumetric error, is previously obtained by experiment. The three thresholds are volumetric error threshold $t_E$, squareness error threshold $t_\phi$ and linear displacement error threshold $t_\delta$ respectively. For simplicity, the inspecting space can be a cube. Regarding volumetric errors, the ratio of line, plane and space can be found by normalizing spatial size. Then, ratio of the error thresholds can be determined by the above found ratio, as shown in equation (6), where $\alpha$ is the error range. Each error threshold will be adjusted by this value.

$$t_E : t_\phi : t_\delta = \alpha\sqrt{3} : \alpha\sqrt{2} : \alpha \quad (6)$$

$$= \alpha : \frac{\alpha\sqrt{2}}{\sqrt{3}} : \frac{\alpha}{\sqrt{3}}$$

For ith pixel, the three-dimensional coordinate at time t can be written as $P_{it}=(x_{it}, y_{it}, z_{it})$. Besides, based on accurate geometric calibration of the three-dimensional sensor 2 and known target distance d, correct three-dimensional coordinate position (coordinate position relative to the golden three-dimensional sensor) can be defined as $P_i^*=(x_i^*, y_i^*, z_i^*)$. Measurement for each error is described in detail as follows.

Measurement of linear displacement error is mainly to measure linear displacement error between two points. The meaning of the measurement is to detect if the linear position sensed by the three-dimensional sensor 2 on a line is a correct position relative to a correct linear position (position sensed by a golden three-dimensional sensor), i.e. if the position relative to each axis exceeds the error threshold. If a position relative to an axis exceeds the error threshold, it means the position is deviated from the correct position relative to that axis. Definition of error measurement relative to each axis is defined as equation (7), equation (8) and equation (9).

$x$-axis displacement error, $\delta x_i = |x_i^* - x_i|$ (7)

$y$-axis displacement error, $\delta y_i = |y_i^* - y_i|$ (8)

$$r_{\delta y_i} = \begin{cases} 1, & \text{for } \delta y_i < t_\delta \\ 0, & \text{else} \end{cases}$$

$z$-axis displacement error, $\delta z_i = |z_i^* - z_i|$ (9)

$$r_{\delta z_i} = \begin{cases} 1, & \text{for } \delta z_i < t_\delta \\ 0, & \text{else} \end{cases}$$

Then, measurement of linear displacement error is judged, as shown in equation (10).

$$R_\delta = \prod_{k=x,y,z} r_{\delta k_i} \quad \text{result} = \begin{cases} \text{Pass,} & \text{for } R_\delta = 1 \\ \text{fail,} & \text{else} \end{cases} \quad (10)$$

Measurement of squareness error is mainly to measure error between two points on a plane. The meaning of the measurement is to detect if the planar position sensed by the three-dimensional sensor 2 is deviated from a correct planar position (planar position sensed by a golden three-dimensional sensor), and if the deviation error is in a standard range. Besides, direction of deviation of the planar position can also be analyzed by measurement of squareness error. Definition of error measurement relative to each plane is defined as equation (11), equation (12) and equation (13).

$$\phi xy_i = \sqrt{(x_i^* - x_i)^2 + (y_i^* - y_i)^2} \quad (11)$$

$$r_{\phi xy_i} = \begin{cases} 1, & \text{for } \phi xy_i < t_\phi \\ 0, & \text{else} \end{cases}$$

$$\phi xz_i = \sqrt{(x_i^* - x_i)^2 + (z_i^* - z_i)^2} \quad (12)$$

$$r_{\phi xz_i} = \begin{cases} 1, & \text{for } \phi xz_i < t_\phi \\ 0, & \text{else} \end{cases}$$

$$\phi yz_i = \sqrt{(y_i^* - y_i)^2 + (z_i^* - z_i)^2} \quad (13)$$

$$r_{\phi xy_i} = \begin{cases} 1, & \text{for } \phi xy_i < t_\phi \\ 0, & \text{else} \end{cases}$$

Then, measurement of squareness error is judged, as shown in equation (14).

$$R_\phi = \prod_{k=xy,xz,yz} r_{\phi k_i} \quad \text{result} = \begin{cases} \text{Pass,} & \text{for } R_\phi = 1 \\ \text{fail,} & \text{else} \end{cases} \quad (14)$$

Measurement of volume error is mainly to measure error between two points in a space. The meaning of the measurement is to detect if the spatial position sensed by the three-dimensional sensor 2 is a correct position relative to a correct spatial position (position sensed by a golden three-dimensional sensor), and if the error in within the cubical threshold. Since each linear displacement error and each squareness error are detected, through this process the detected position is assured to be in the error range, and the deviation and deviation direction of its spatial position from the correct spatial position also conform to predetermined specification. Definition of measurement of volumetric error is defined as equation (15).

$$E = \sqrt{\delta x_i^2 + \delta y_i^2 + \delta z_i^2} \quad (15)$$

$$r_E = \begin{cases} 1, & \text{for } E < t_\phi \\ 0, & \text{else} \end{cases}$$

Then, measurement of volumetric error is judged, as shown in equation (16).

$$\text{result} = \begin{cases} \text{Pass,} & \text{for } R_E = 1 \\ \text{fail,} & \text{else} \end{cases} \quad (16)$$

Figure 4:
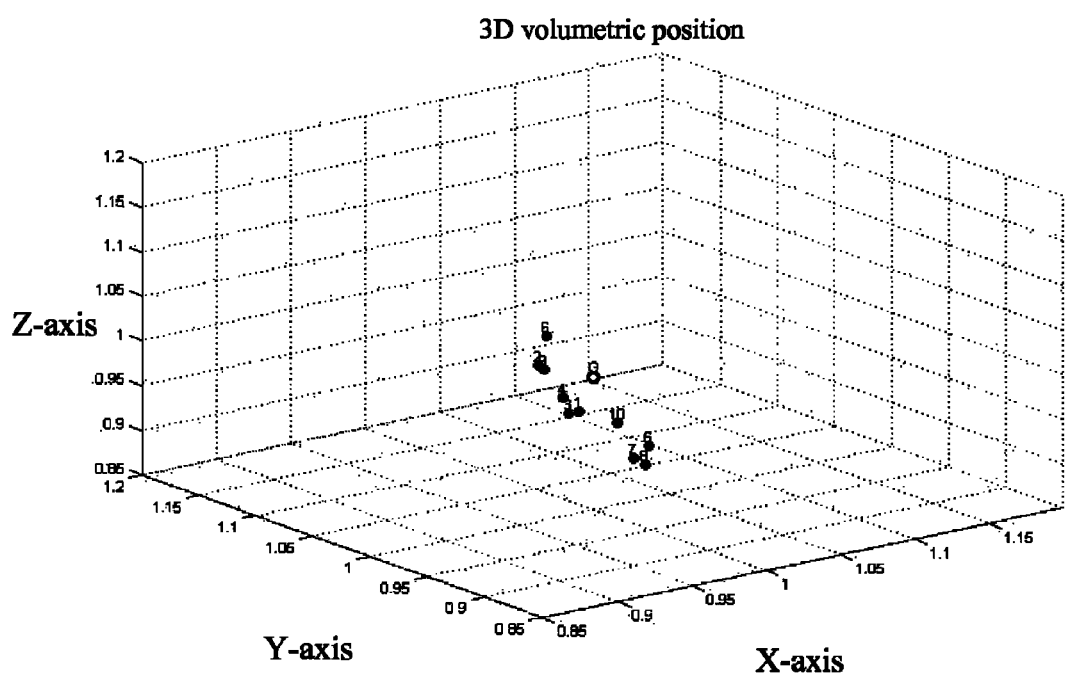
FIG. 4 shows distribution in the space of ten random points generated by a simulation method near a point of a known correct position.
Figure 5:
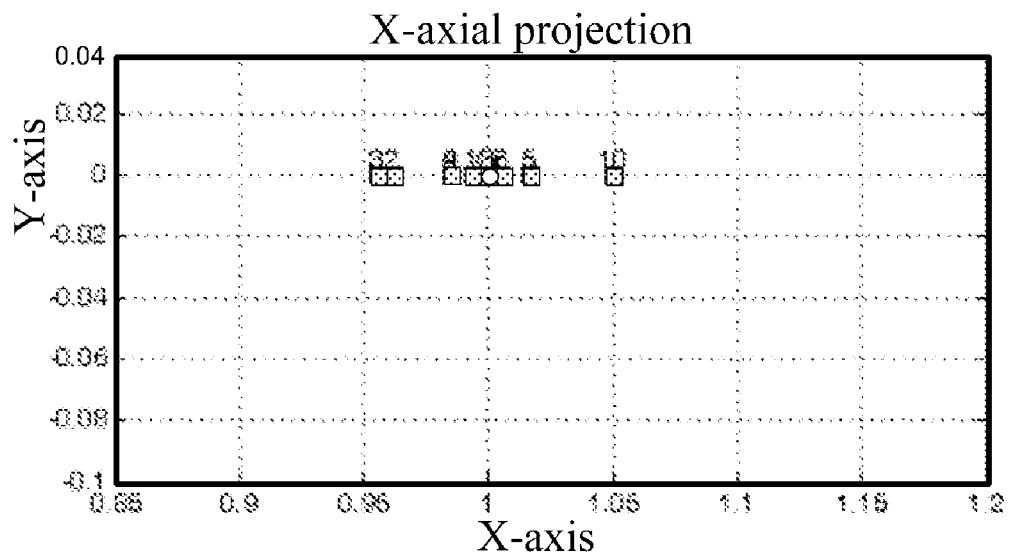
FIG. 5 is the distribution of all points in FIG. 4 projected on the X-axis.
Figure 6:
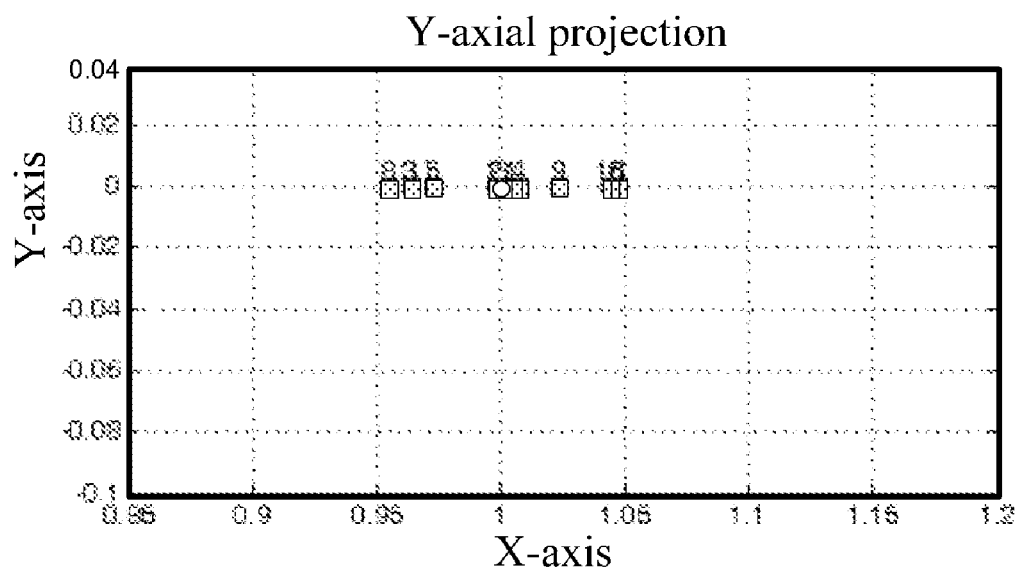
FIG. 6 is the distribution of all points in FIG. 4 projected on the Y-axis.
Figure 7:
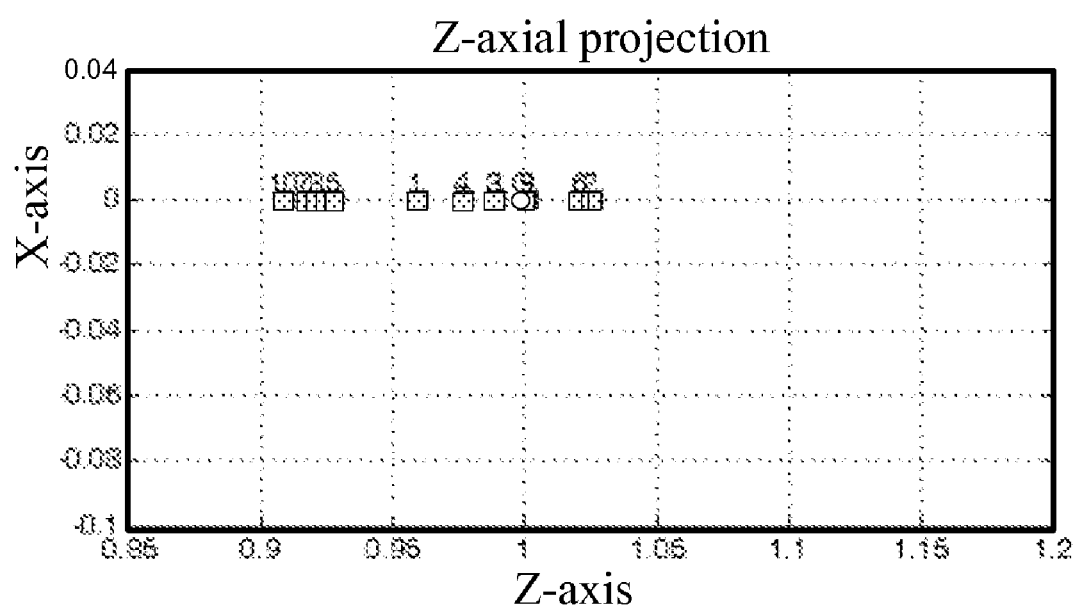
FIG. 7 is the distribution of all points in FIG. 4 projected on the Z-axis.
Figure 8:
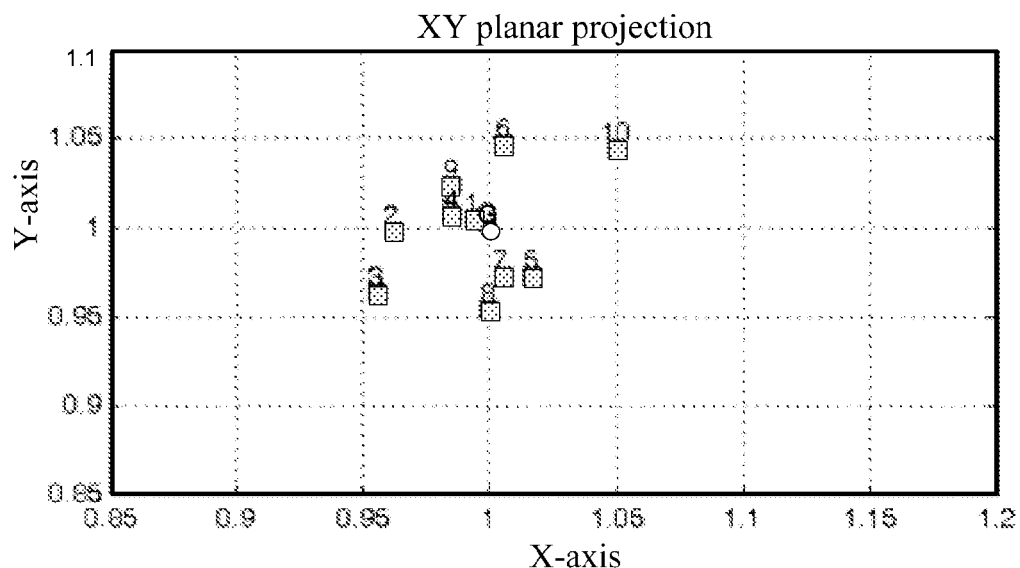
FIG. 8 is the distribution of all points in FIG. 4 projected on the XY-plane.
Figure 9:
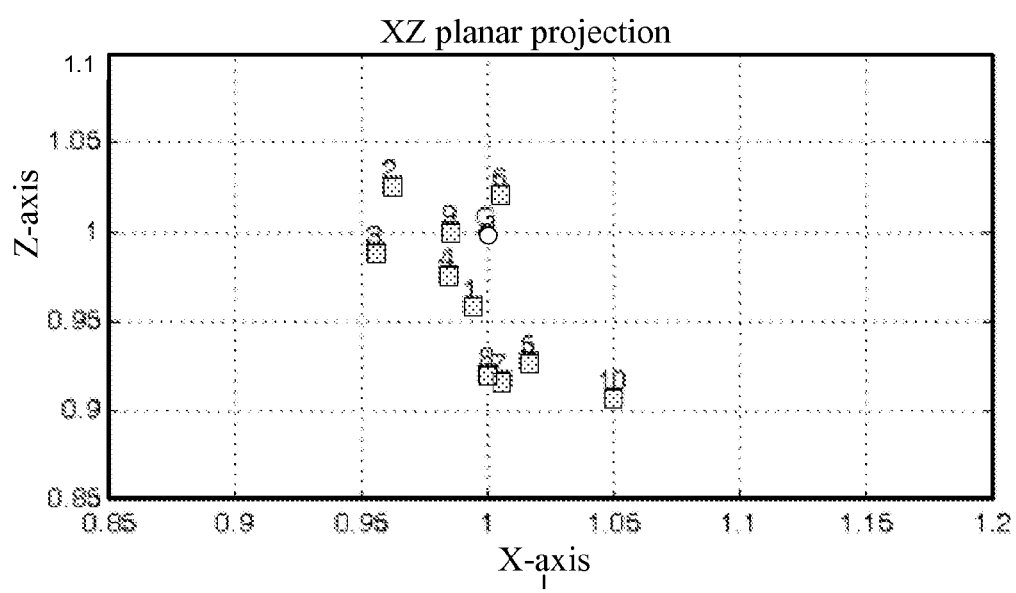
FIG. 9 is the distribution of all points in FIG. 4 projected on the XZ-plane.
Figure 10:
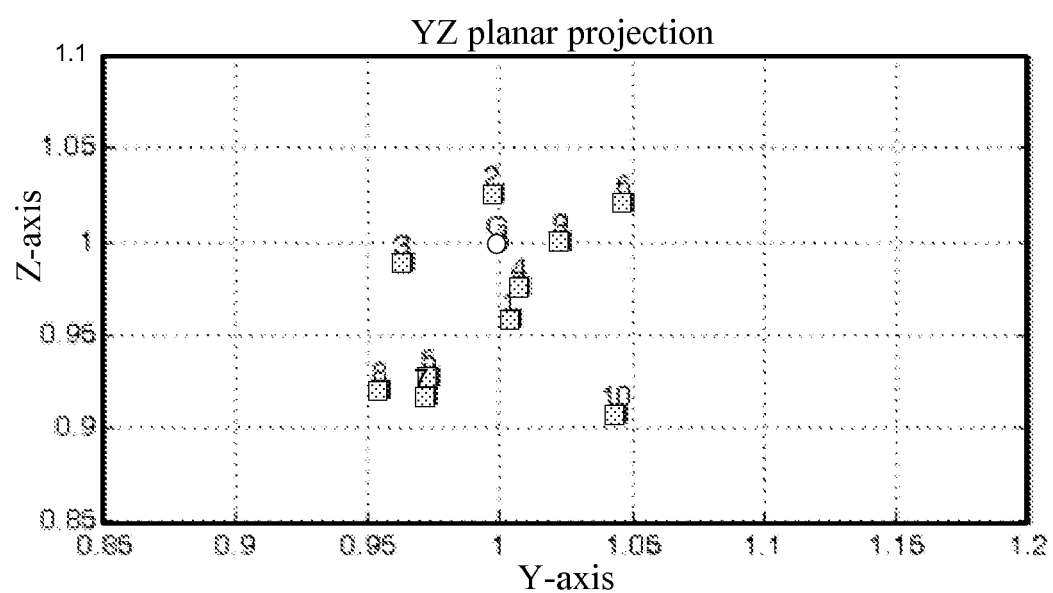
FIG. 10 is the distribution of all points in FIG. 4 projected on the YZ-plane.

The following is a simulation for testing abovementioned algorithm. Then simulation method generates 10 random points near a point of a known correct position, and judges the errors using the method proposed by the invention, so as to test and verify reliability and effectiveness of the method. Distribution in the space of the ten randomly generated points is shown in FIG. 4; distribution of the ten points projected on each axis (X-axis, Y-axis and Z-axis) is shown in FIGS. 5, 6 and 7; distribution of the ten points projected on each plane (XY-plane, XZ-plane and YZ-plane) is shown in FIGS. 8, 9 and 10. In the figures, the hollow point represents the correct position (position sensed by the golden three-dimensional sensor) whose coordinate is (1,1,1), and surrounding ten solid points represent ten coordinates sensed by the three-dimensional sensor to be tested relative to the correct position.

Figure 11:
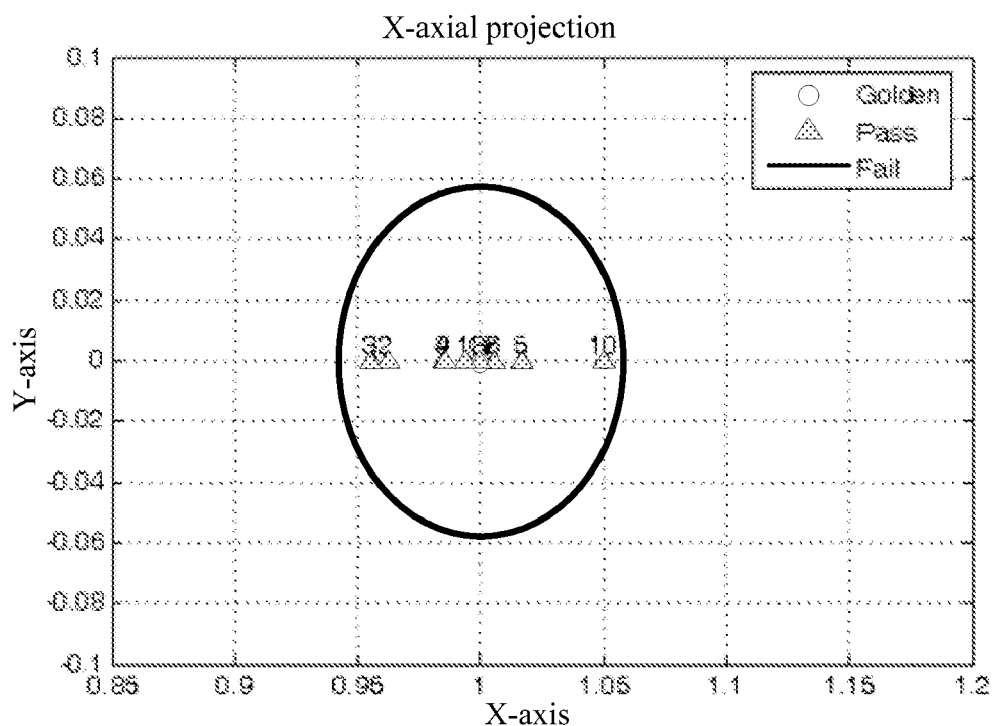
FIG. 11 is the result of measuring linear displacement errors of the simulated points projected on the X-axis.
Figure 12:
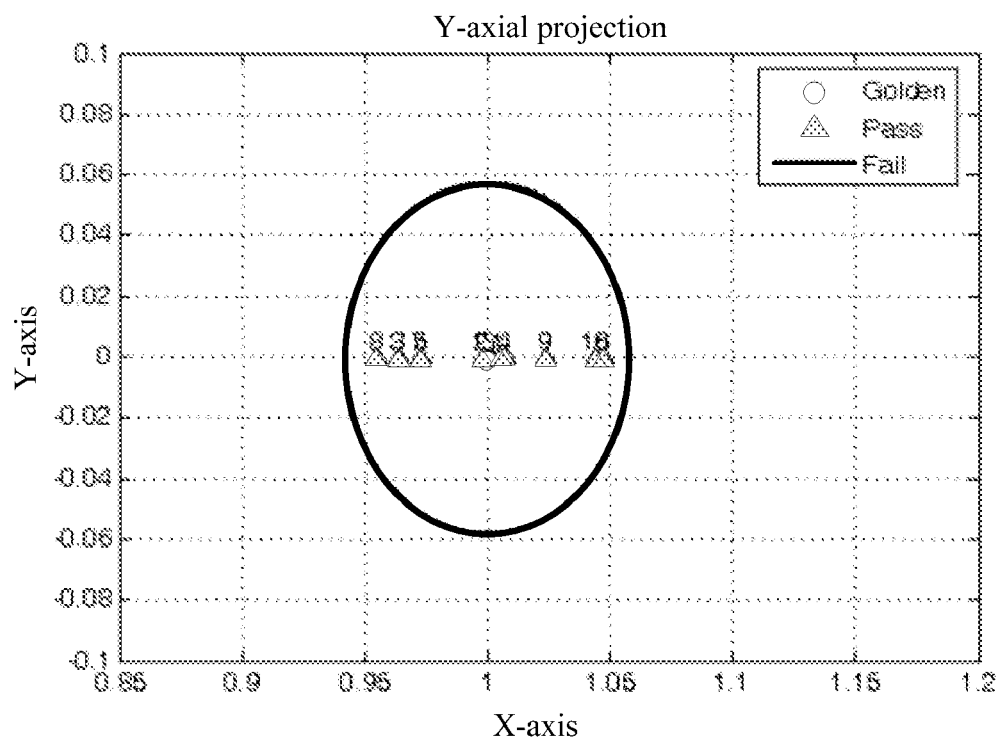
FIG. 12 is the result of measuring linear displacement errors of the simulated points projected on the Y-axis.
Figure 13:
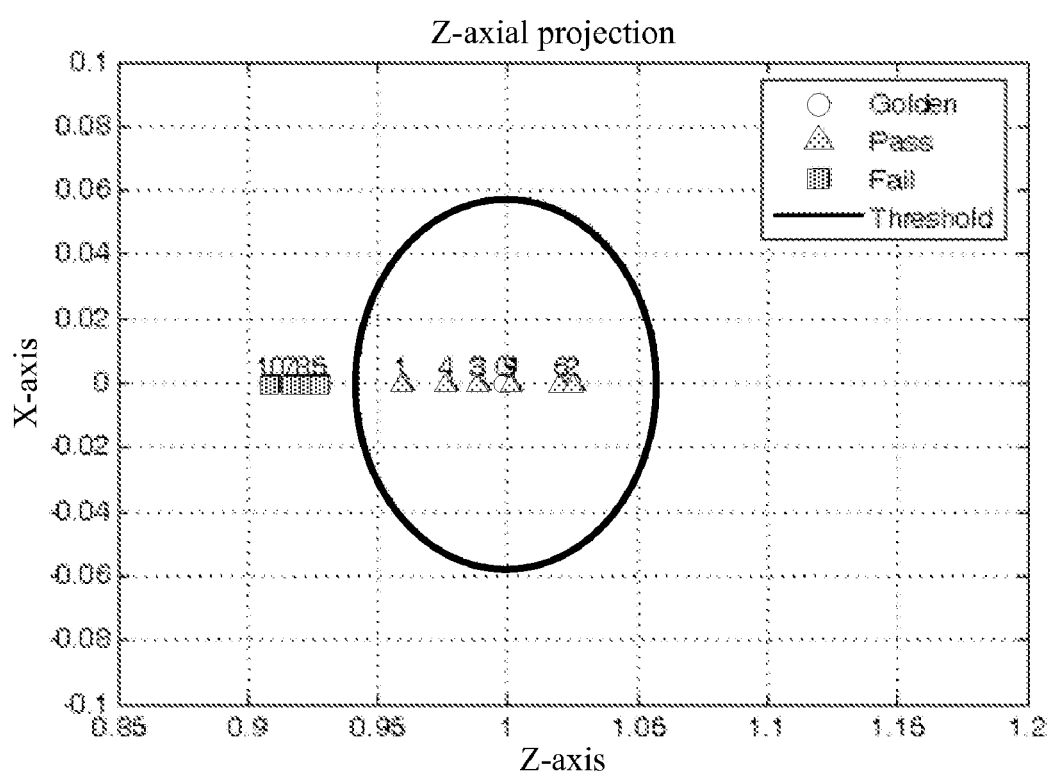
FIG. 13 is the result of measuring linear displacement errors of the simulated points projected on the Z-axis.
Figure 14:
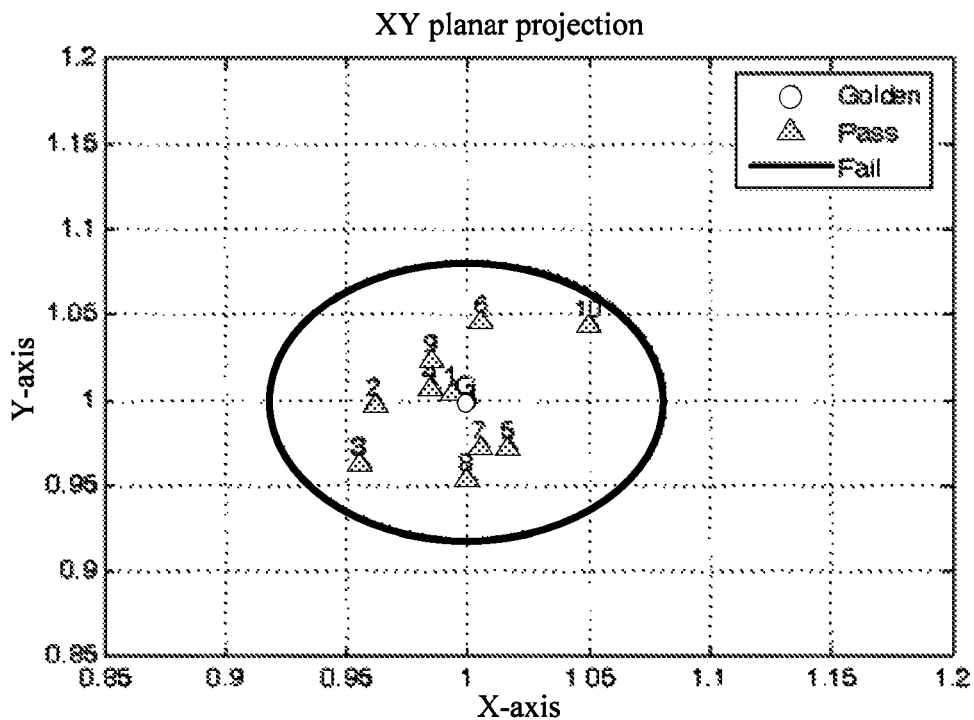
FIG. 14 is the result of measuring squareness errors of the simulated points projected on the XY-plane.
Figure 15:
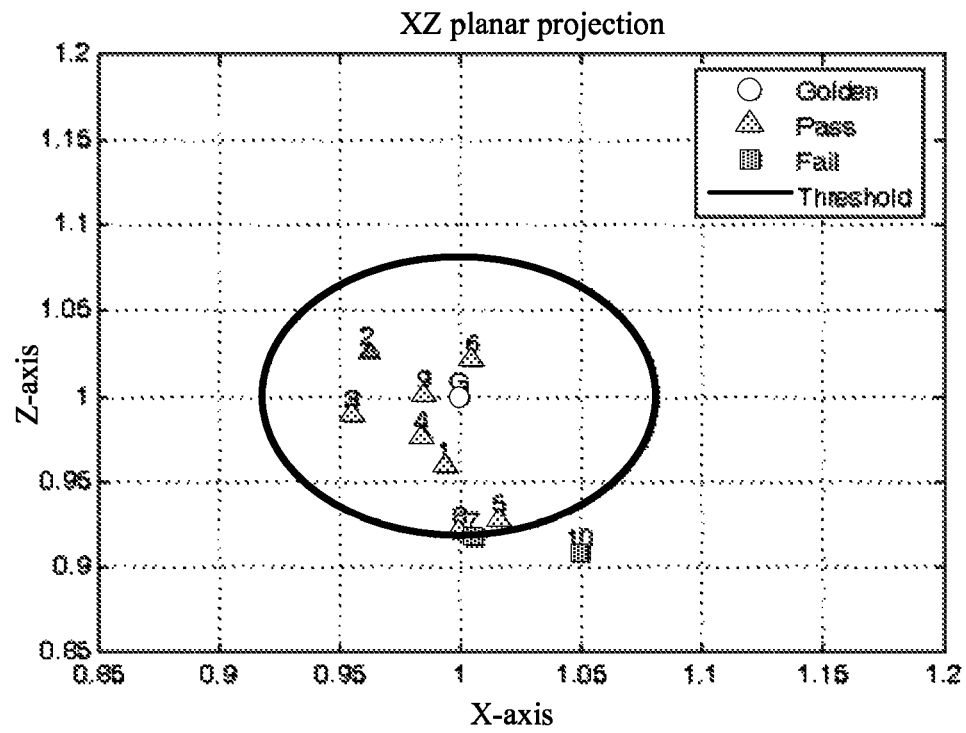
FIG. 15 is the result of measuring squareness errors of the simulated points projected on the XZ-plane.
Figure 16:
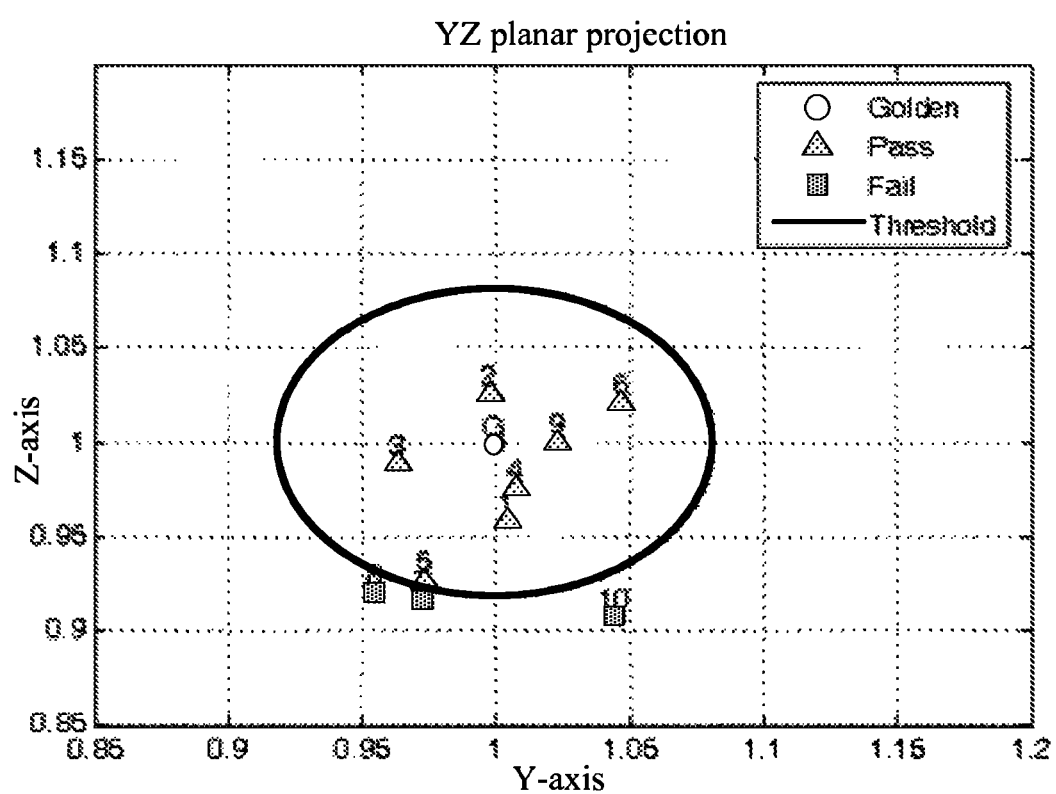
FIG. 16 is the result of measuring squareness errors of the simulated points projected on the YZ-plane.
Figure 17:
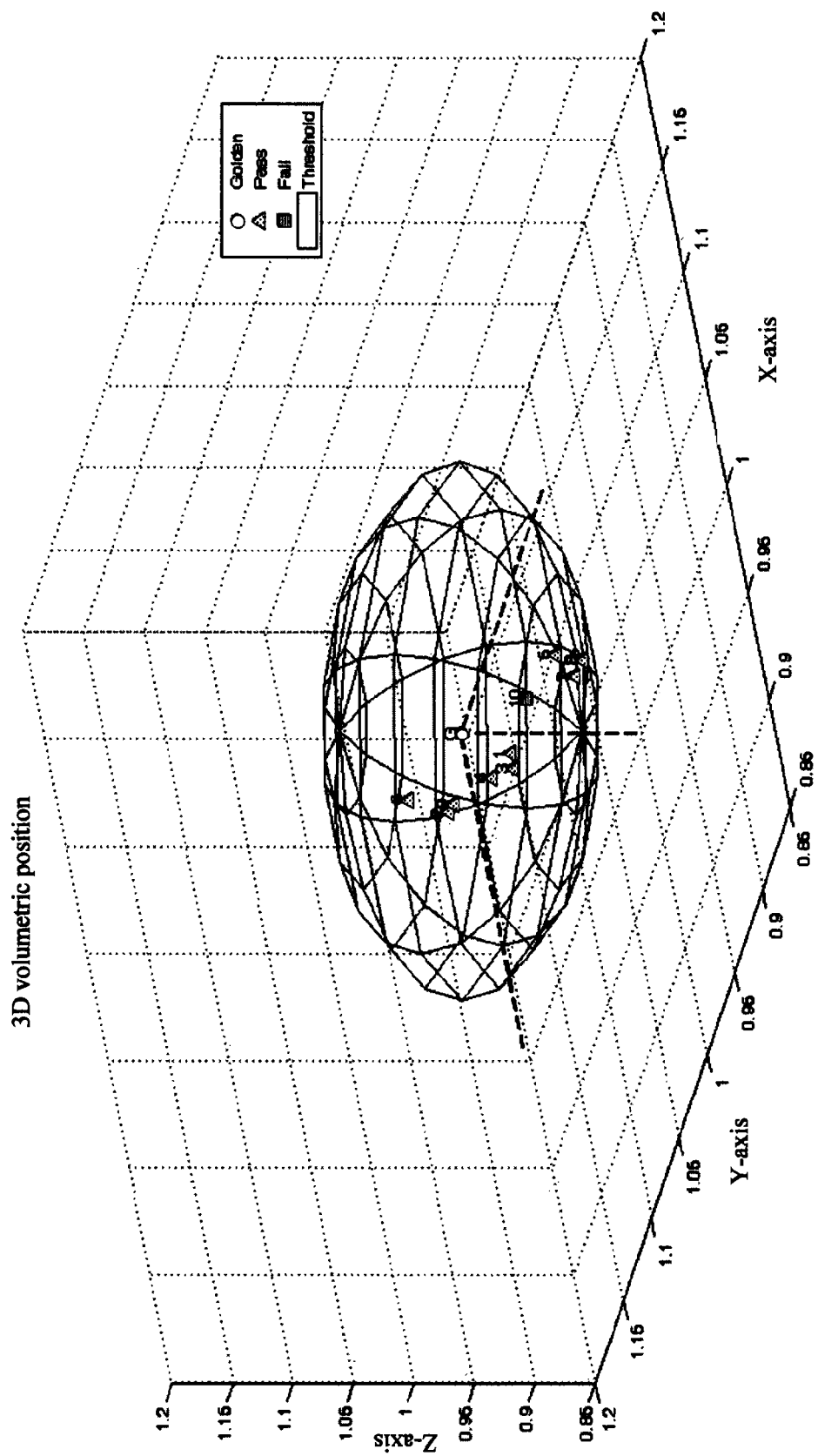
FIG. 17 is the result of measuring volumetric errors of the simulated points.

Then, proposed methods are respectively applied to the error measurement simulation. This simulation will analyze functions and effects of each process at certain levels. Besides, the defined spatial error in the simulation is 10%. At first, measurement of linear displacement error is performed, and the result is shown in FIGS. 11, 12 and 13. It can be seen that some points at Z-axis are beyond the range of the error threshold. From that one can found that positions of these points are questionable at Z-axis relative to the correct position. Then, measurement of squareness error is performed, and the result is shown in FIGS. 14, 15 and 16. On XZ-plane and YZ-plane some points are beyond the range of the error threshold. From that one can know the relative planar deviation directions of the points beyond the error threshold. At last, measurement of squareness error is performed, and the result is shown in FIG. 17. The error of the tenth point is beyond the range of threshold.

Figure 18:
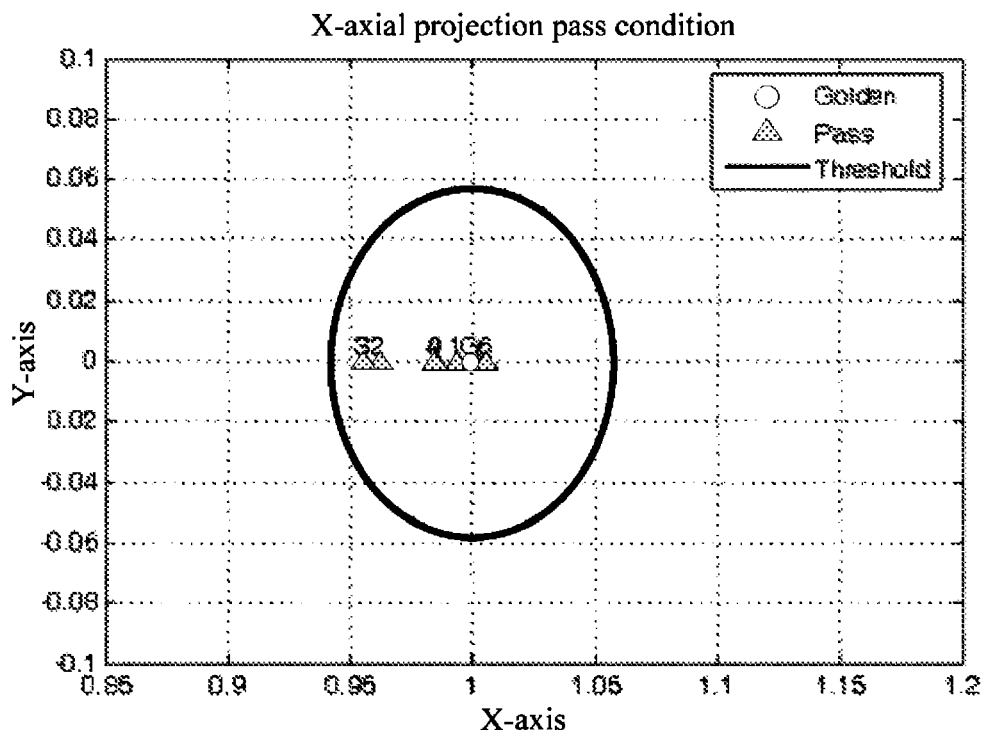
FIG. 18 is the simulated X-axial test result of the three-dimensional sensitivity.
Figure 19:
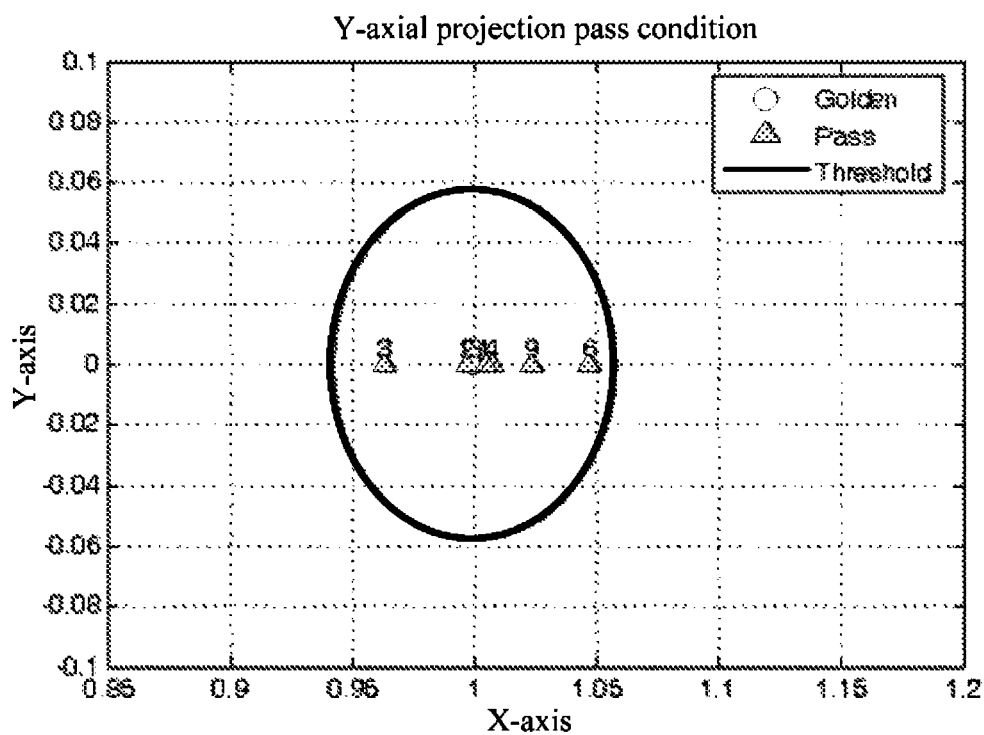
FIG. 19 is the simulated Y-axial test result of the three-dimensional sensitivity.
Figure 20:
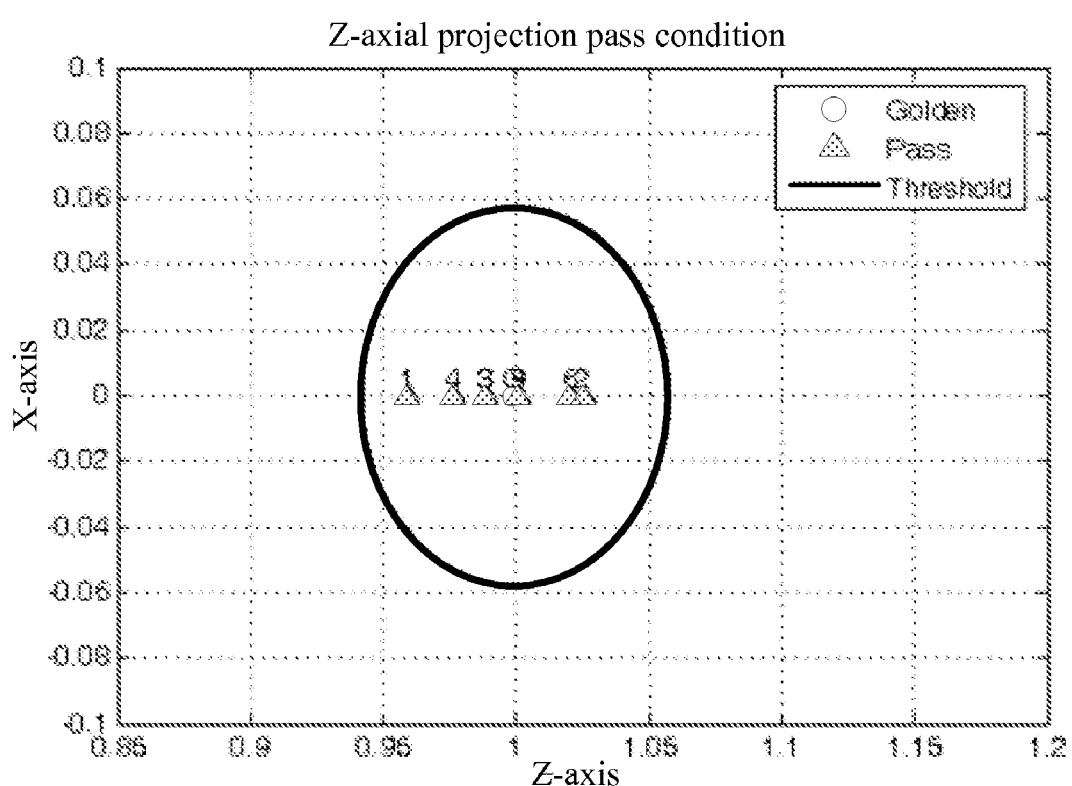
FIG. 20 is the simulated Z-axial test result of the three-dimensional sensitivity.
Figure 21:
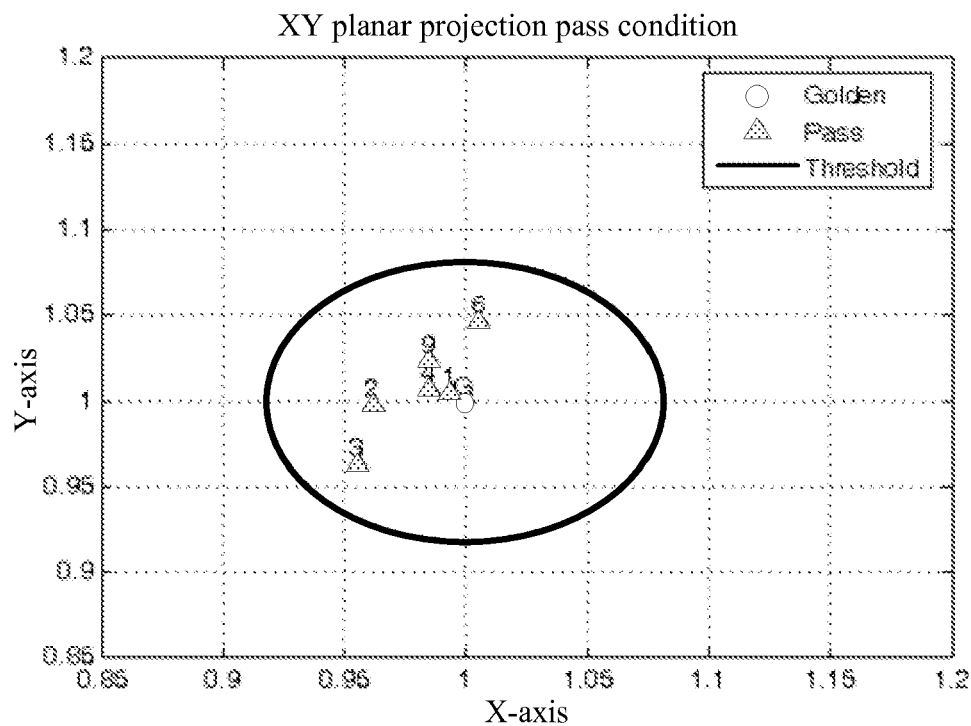
FIG. 21 is the simulated XY-planar test result of the three-dimensional sensitivity.
Figure 22:
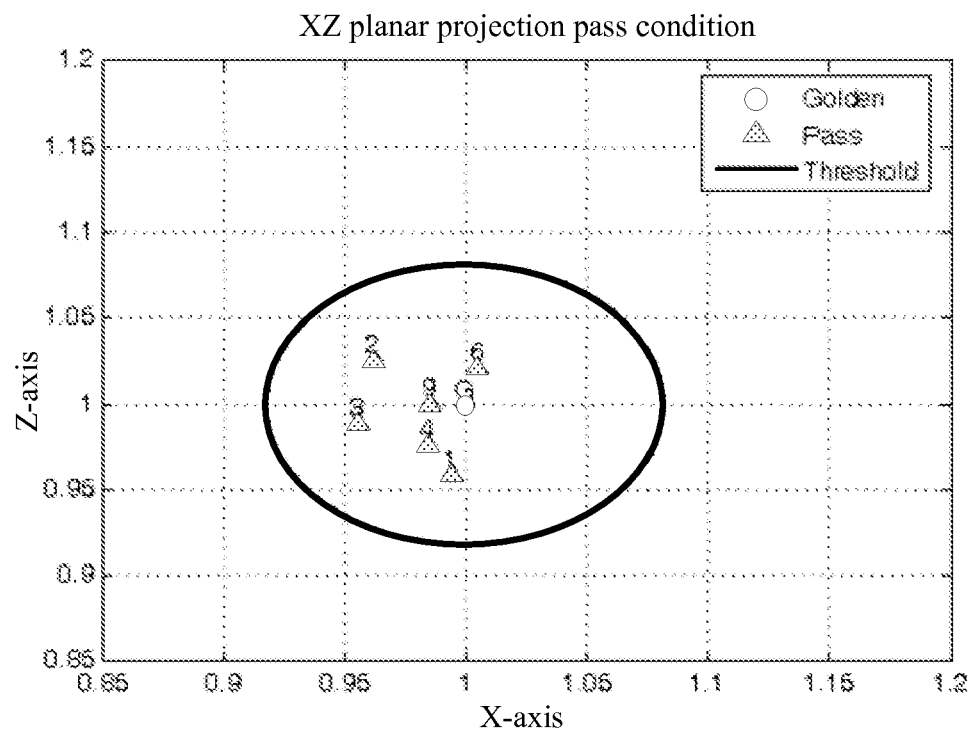
FIG. 22 is the simulated XZ-planar test result of the three-dimensional sensitivity.
Figure 23:
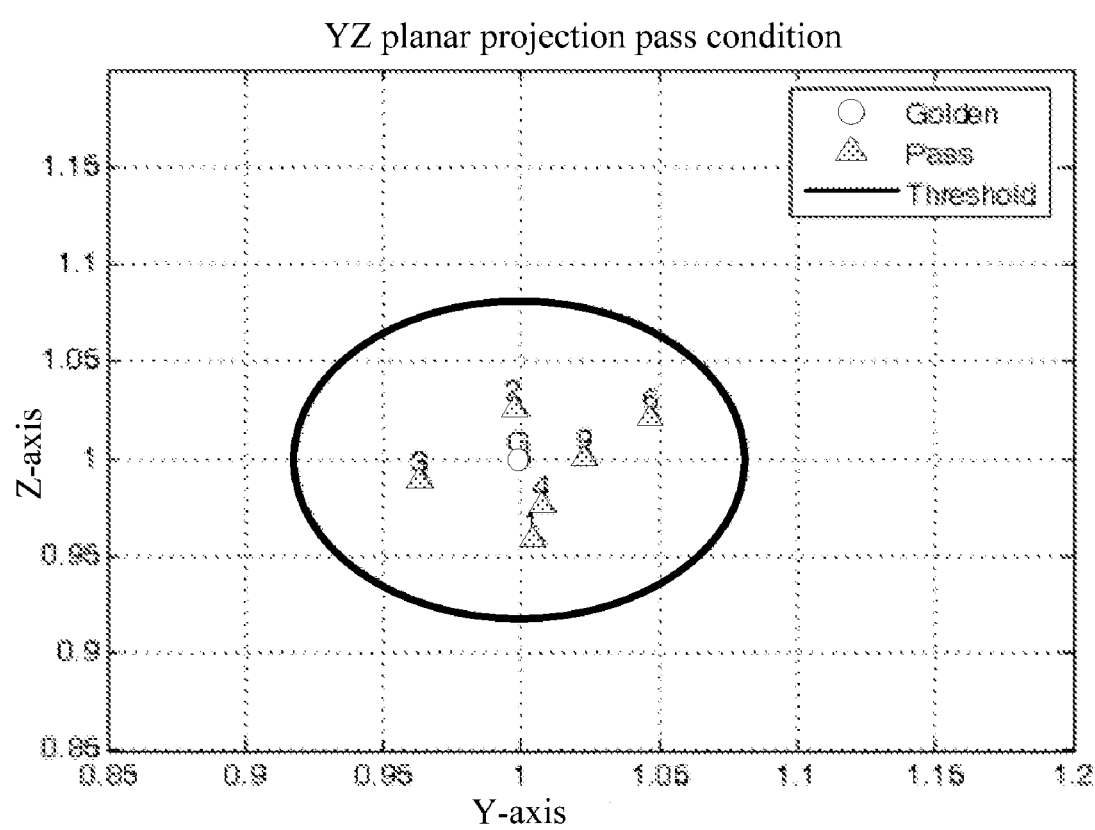
FIG. 23 is the simulated YZ-planar test result of the three-dimensional sensitivity.
Figure 24:
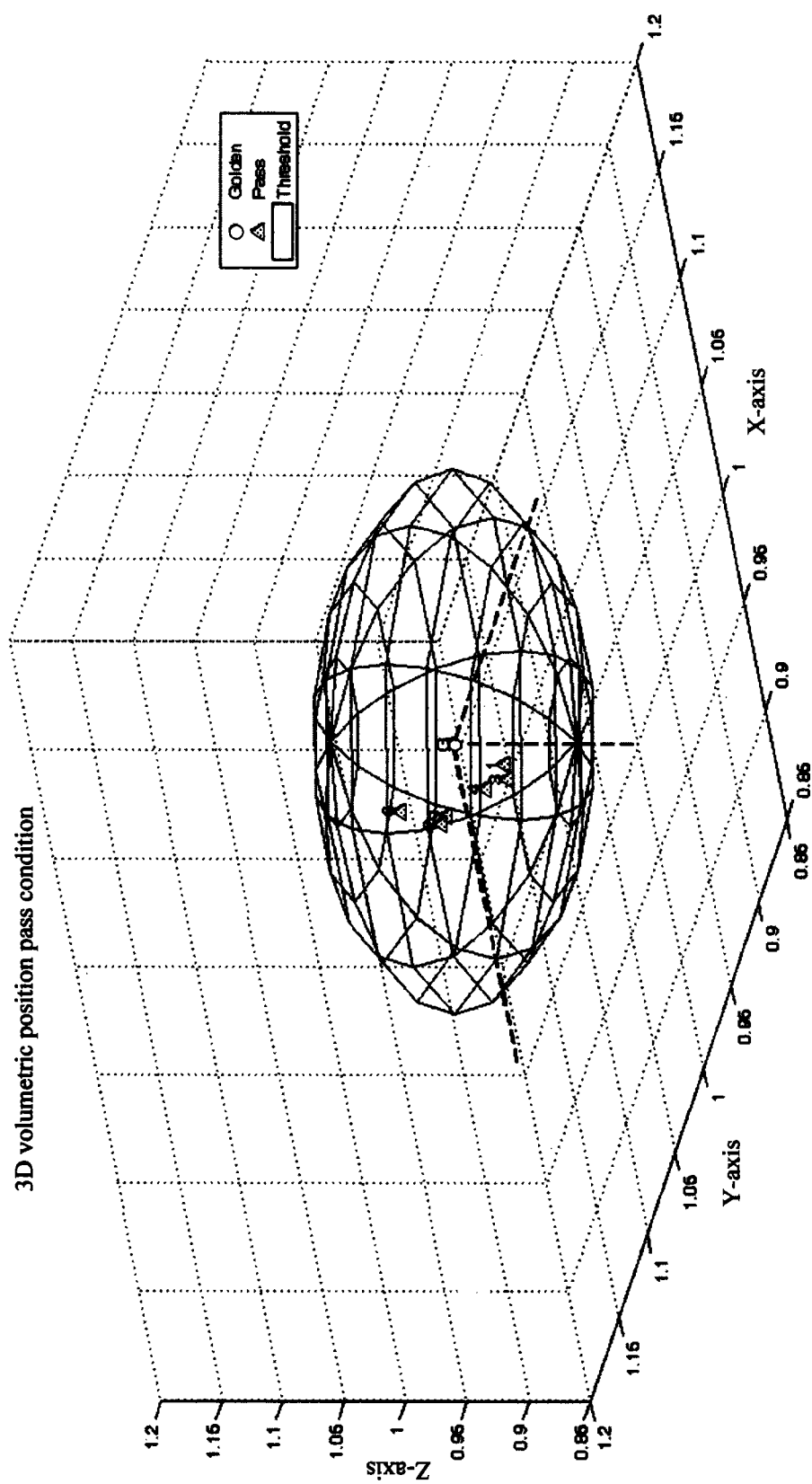
FIG. 24 is the simulated spatial test result of the three-dimensional sensitivity.

As to the test results of the whole three-dimensional sensitivity using above simulation, the axial test result is shown in FIGS. 18, 19 and 20, the planar test result is shown in FIGS. 21, 22 and 23, and the spatial test result is shown in FIG. 24, respectively.

Figure 25:
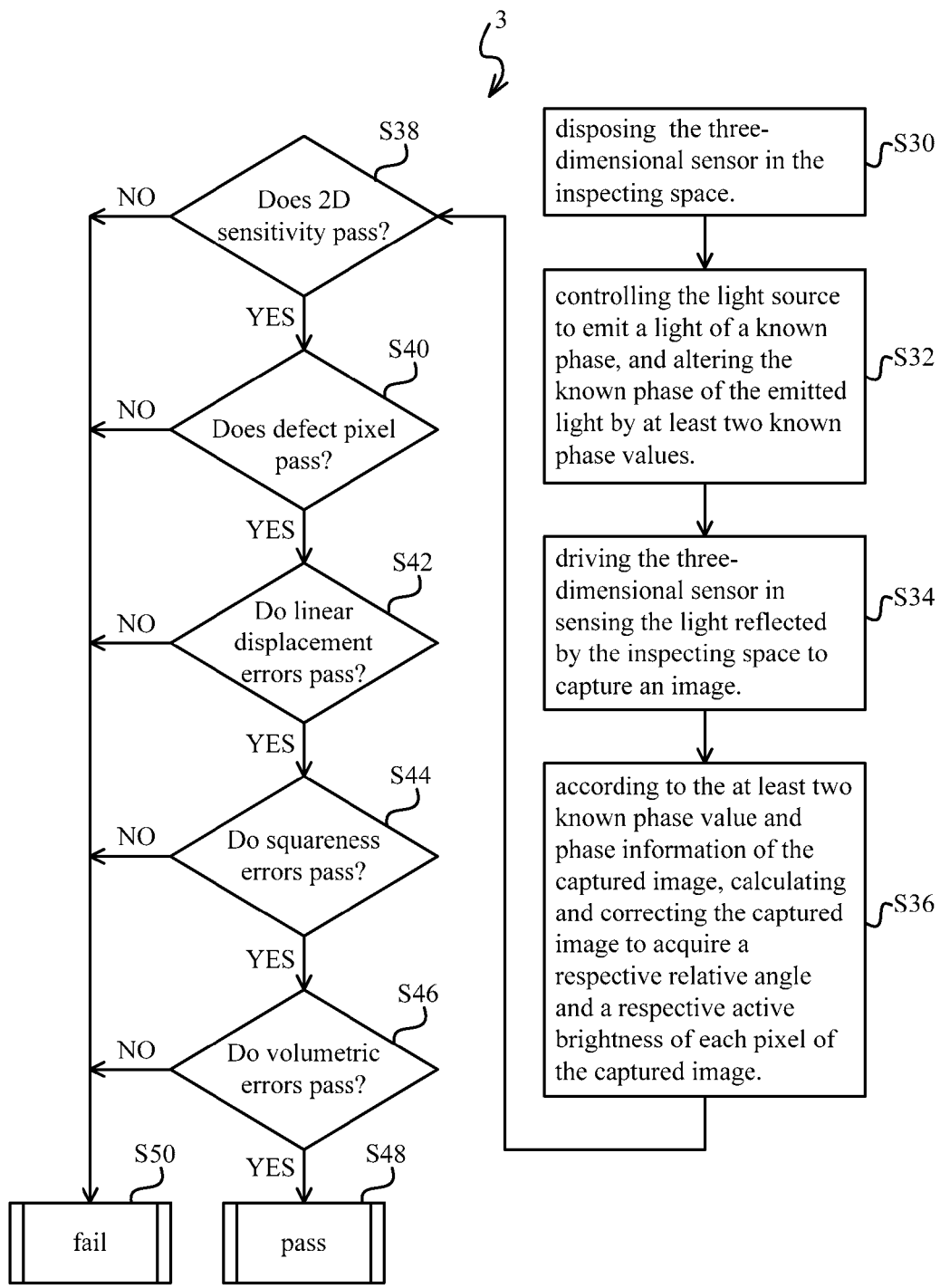
FIG. 25 is a flow chart illustrating the inspecting method 3 according to one preferred embodiment of the invention.

Please refer to FIG. 25. FIG. 25 is a flow chart illustrating the inspecting method 3 according to one embodiment of the invention. The inspecting method 3 according to the invention is used for inspecting a three-dimensional sensor. Implementation background of the inspecting method 3 according to the invention is that an inspecting space without leak of light is previously provided, a light source is disposed in the inspecting space, and a plurality of reference data are previously stored.

The inspecting method 3 according to the invention, firstly, performs step S30 to dispose the three-dimensional sensor in the inspecting space.

Then, the inspecting method 3 performs step S32 to control the light source to emit a light of a known phase, and to alter the known phase of the emitted light by at least two known phase values.

Next, the inspecting method 3 performs step S34 to drive the three-dimensional sensor in sensing the light reflected by the inspecting space to capture an image.

Then, the inspecting method 3 performs step S36 to, according to the at least two known phase value and phase information of the captured image, calculates and corrects the captured image to acquire a respective relative angle and a respective active brightness of each pixel of the captured image.

Finally, the inspecting method 3, according to the captured image and the relative angle and the active brightness of each pixel thereof and the plurality of reference data, calculates at least two quality data relative to the three-dimensional sensor. And the inspecting method judges if the quality of the three-dimensional sensor passes in accordance with the quality data.

For example, as shown in FIG. 7, step S38 is to judge if the two-dimensional sensitivity of the three-dimensional sensor passes. Step S40 is to judge if the defect pixel of the three-dimensional sensor passes. Step S42 is to judge if the linear displacement error of the three-dimensional sensor passes. Step S44 is to judge if the squareness error of the three-dimensional sensor passes. Step S46 is to judge if the volumetric error of the three-dimensional sensor passes. If all judged results above are passing, step S48 is then performed to send to the signal of pass of the quality of the three-dimensional sensor. If any of the judged results is fail, step S S50 is then performed to send the signal of fail of the quality of the three-dimensional sensor.

By above detailed description of the invention, it is clear that the inspecting system and method according to the invention has the advantages of convenience and safety. Moreover, the inspecting system and method according to the invention can be used for inspecting quality data such as defect pixel and sensitivity of large number of three-dimensional sensors. Therefore, the three-dimensional sensor can conform to the standard specification of the income quality control.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A system for inspecting a three-dimensional sensor, comprising:
 a casing configured to form an inspecting space without leak of light, wherein the three-dimensional sensor is disposed in the casing;
 a light source, mounted in the casing;
 a storage device therein storing a plurality of reference data; and
 a controlling/processing device, electrically connected to the three-dimensional sensor, the light source and the storage device respectively, the controlling/processing device functioning controlling the light source to emit a light of a known phase and altering the known phase of the emitted light by at least two known phase values, the controlling/processing device also functioning driving the three-dimensional sensor in sensing the light reflected by the inspecting space to capture an image, the controlling/processing device calculating and correcting the captured image in accordance with the at least two known phase value and phase information of the captured image to acquire a respective relative angle and a respective active brightness of each pixel of the captured image, and calculating at least two quality data relative to the three-dimensional sensor in accordance with the captured image and the relative angle and the active brightness of each pixel thereof and the plurality of reference data.

2. The system of claim 1, wherein the least two quality data relative to the three-dimensional sensor comprise a two-dimensional sensitivity, the plurality of reference data comprise a golden range of average gray value, and the controlling/processing device calculates the average gray value of the captured image, and calculates the two-dimensional sensitivity in accordance with the average gray value of the captured image and the golden range of average gray value.

3. The system of claim 1, wherein the at least two quality data relative to the three-dimensional sensor comprise a defect pixel data, the plurality of reference data comprise a brightness threshold of the captured image acquired by a golden sensor, and the controlling/processing device selectively determines the defect pixel data in accordance with the captured image and the brightness threshold of the captured image.

4. The system of claim 1, wherein the plurality of reference data comprise a Z-axial calibration data and an XY-axial calibration data acquired by a golden sensor, and the controlling/processing device also transforms the captured image and the relative angle and the active brightness of each pixel thereof into a plurality of sets of world coordinates.

5. The system of claim 4, wherein the at least two quality data relative to the three-dimensional sensor comprise a plurality of sets of linear displacement errors, a plurality of sets of squareness errors and a plurality of sets of volumetric errors, the plurality of reference data comprise a plurality of sets of world coordinates relative to the golden sensor, the controlling/processing device also calculates the plurality of sets of linear displacement errors, the plurality of sets of squareness errors and the plurality of sets of volumetric errors in accordance with the plurality of sets of world coordinates relative to the captured image and the plurality of sets of world coordinates relative to the golden sensor.

6. A method for inspecting a three-dimensional sensor, an inspecting space without leak of light being previously provided, a light source being disposed in the inspecting space, a plurality of reference data being previously stored, said method comprising the steps of:
 (a) disposing the three-dimensional sensor in the inspecting space;
 (b) controlling the light source to emit a light of a known phase, and altering the known phase of the emitted light by at least two known phase values;
 (c) driving the three-dimensional sensor in sensing the light reflected by the inspecting space to capture an image;
 (d) according to the at least two known phase value and phase information of the captured image, calculating and correcting the captured image to acquire a respective relative angle and a respective active brightness of each pixel of the captured image; and
 (e) according to the captured image and the relative angle and the active brightness of each pixel thereof and the plurality of reference data, calculating at least two quality data relative to the three-dimensional sensor.

7. The method of claim 6, wherein the least two quality data relative to the three-dimensional sensor comprise a two-dimensional sensitivity, the plurality of reference data comprise a golden range of average gray value, and step (e) is to calculate the average gray value of the captured image, and to calculate the two-dimensional sensitivity in accordance with the average gray value of the captured image and the golden range of average gray value.

8. The method of claim 6, wherein the at least two quality data relative to the three-dimensional sensor comprise a defect pixel data, the plurality of reference data comprise a brightness threshold of the captured image acquired by a golden sensor, and step (e) is to selectively determine the defect pixel data in accordance with the captured image and the brightness threshold of the captured image.

9. The method of claim 6, wherein the plurality of reference data comprise a Z-axial calibration data and an XY-axial calibration data acquired by a golden sensor, and step (e) is also to transform the captured image and the relative angle and the active brightness of each pixel thereof into a plurality of sets of world coordinates.

10. The method of claim 9, wherein the at least two quality data relative to the three-dimensional sensor comprise a plurality of sets of linear displacement errors, a plurality of sets of squareness errors and a plurality of sets of volumetric errors, the plurality of reference data comprise a plurality of sets of world coordinates relative to the golden sensor, step (e) is also to calculate the plurality of sets of linear displacement errors, the plurality of sets of squareness errors and the plurality of sets of volumetric errors in accordance with the plurality of sets of world coordinates relative to the captured image and the plurality of sets of world coordinates relative to the golden sensor.

* * * * *